United States Patent Office  3,452,279
Patented June 24, 1969

3,452,279
TEST FIXTURE FOR MEASURING IMPEDANCE PARAMETERS OF DIODES OPERATED AT MICROWAVE FREQUENCIES
Gerald C. Di Piazza, Randolph Township, Morris County, N.J., assignor to Bell Telephone Laboratories, Incorporated, New York, N.Y., a corporation of New York
Filed Mar. 3, 1966, Ser. No. 531,421
Int. Cl. G01r 27/16, 35/00, 27/04
U.S. Cl. 324—158        12 Claims

ABSTRACT OF THE DISCLOSURE

A fixture for measuring impedance parameters of diodes operated at microwave frequencies is provided, comprising a tapped resonator connected at a point along a transmission line. The resonator comprises an adjustable short-circuited stub and an open-circuited stub having the diode to be tested connected across its open end. The two stubs have a total length substantially equal to an odd number of quarter wavelengths at the test frequency.

---

This invention relates to the art of electrical measurements and more particularly to a device for measuring the impedance parameters of a diode operating at microwave frequencies.

Diodes are currently being used as complex impedances at microwave frequencies and since they can be biased they can be electrically adjusted to different values of impedance depending upon the degree of bias. Where these devices are to be used to digitally tune or adjust microwave circuits they are operated as two-state devices, one state determined by a reverse bias and the other state by a forward bias. The equivalent circuit of these diodes is represented by a network of impedance components and the successful design of circuits to use them requires a knowledge of the values of these impedance components at the desired operating frequency. The measurement of these components with adequate precision has been a particularly difficult problem.

A filter with diodes operating in the manner suggested above is described in applicant's copending application entitled "Digitally Tuned Microwave Filter," Ser. No. 406,739, filed Oct. 27, 1964. It was pointed out in this copending application that the filter could be used to "characterize" diodes. Applicant has discovered some unusual properties of this type of filter which, when taken advantage of, enables very precise determination of the impedance parameters of the diodes.

It is an object of this invention to accurately measure the impedance parameters of the electrically equivalent circuit of a diode operating at microwave frequencies.

The foregoing object is achieved by this invention by means of a tapped resonator connected to a point along a transmission line, the resonator comprising a short-circuited stub and an open-circuited stub, the two stubs having a total length substantially equal to an odd number of quarter wavelengths at the test frequency, but not less than three such lengths. The open-circuited stub includes means for connecting the diode to be tested across its open end while the short-circuited stub is adjustable to a known length which must include an odd number of quarter wavelengths at the test frequency.

The invention may be better understood by reference to the accompanying drawings, in which.

Figure 3:
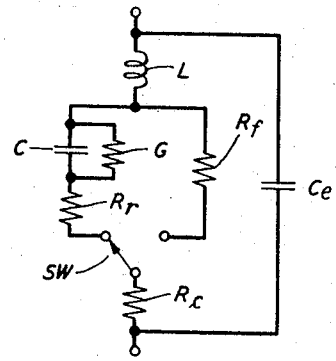
Figure 4:
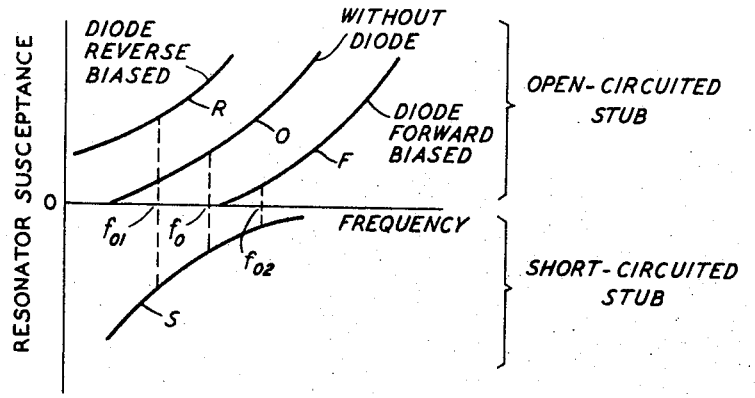
Figure 5:
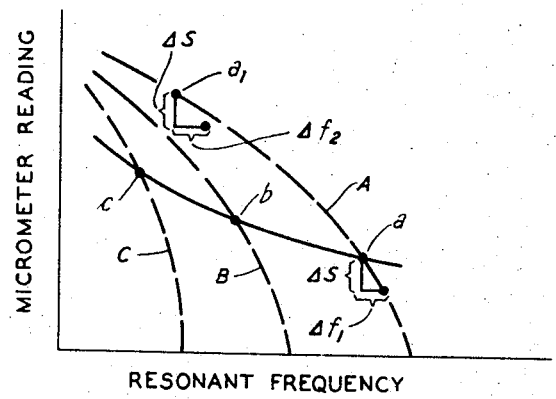

FIG. 3 discloses a more complete equivalent diagram of a diode operating at microwave frequencies;

FIGS. 4 and 5 are curves illustrating the operation of the invention; and

Figure 6:
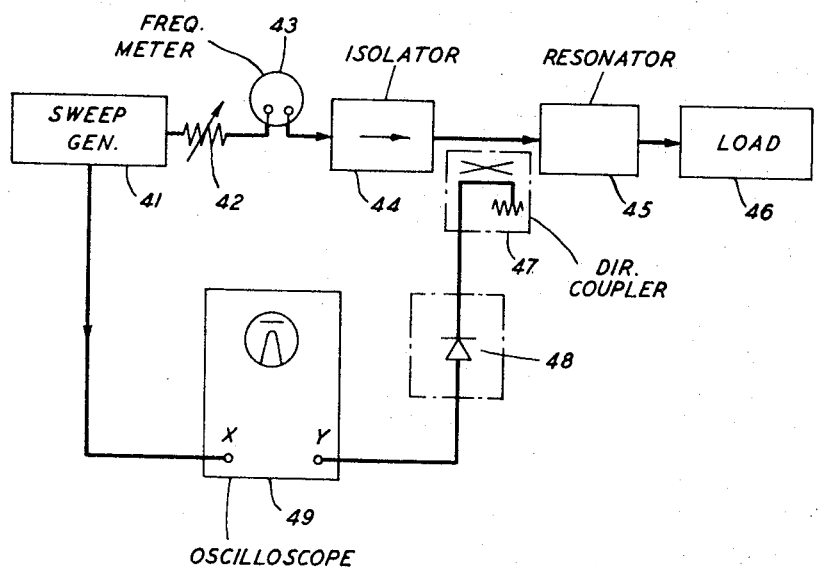

FIG. 6 is a circuit diagram of a typical circuit which may be used in making measurements with this invention.

Figure 1:
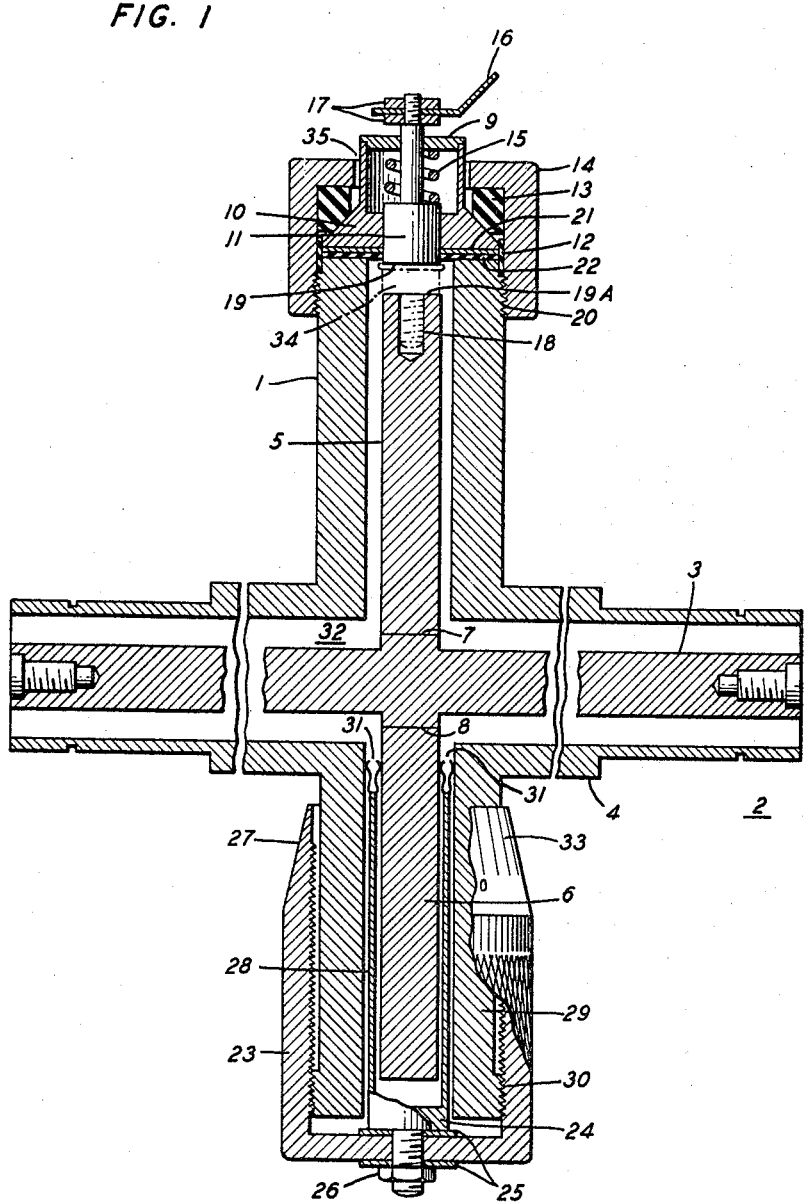
FIG. 1 illustrates the essential mechanical features of a preferred embodiment of the invention.

In FIG. 1 reference numeral 2 relates to a section of coaxial transmission line having conventional means for connection of this line to other apparatus. This transmission line comprises an inner conductor 3 and an outer conductor 4. At a junction point 32 along the length of this line an open-circulated stub is connected having an outer conductor 1 and an inner conductor 5. Although both the coaxial line and the stub are shown as coaxial structures, this is not essential to the practice of this invention, as other types of transmission lines are well known in the art and may be substituted. Directly opposite the open-circuited stub and also connected to the transmission line at the same junction point, is a short-circuited stub comprising an inner conductor 6 and an outer conductor 29. The outer conductors 1 and 29 of the open-circuited and short-circuited stubs, respectively, are preferably formed integral with the outer conductor 4 of the transmission line in accordance with conventional practice. The inner conductor 5 is sweated to a short lateral extension of the inner conductor 3 forming a joint 7 while a similar joint 8 is formed between the inner conductors 3 and 6. As shown in FIG. 1, the short-circuited stub and the open-circuited stub are shown diametrically opposed with reference to the transmission line but this angular relationship is not essential as these stubs may form any convenient angle with each other and the transmission line.

The upper end of inner conductor 5 is provided with a recess 18 to receive the mounting stud of a conventional diode 34 so that the lower end of the diode case may be effectively connected exactly at the plane formed by the upper surface 19A of inner conductor 5. A resiliently mounted diode connector 11 having a plane surface 19, directly opposing the upper surface 19A of inner conductor 5, serves to clamp the diode terminals between surfaces 19 and 19A. The diode connector 11 is provided with this resilient force by reason of a spring 15 which reacts against the upper washer 9 which is made integral with the diode connector guide 10. The lower end of guide 10 is of conical shape with a central aperture slidably receiving the diode connector 11 and having a hollow cylindrical portion extending upwardly to which the washer 9 is secured. The space between the lower surface of guide 10 and the upper surface of outer conductor 1 is filled with a metallic washer 21 and a mica insulator 22, the thicknesses of which have been considerably exaggerated for the sake of clarity. Actually, the mica washer is quite thin and serves two functions; first, it conductively insulates guide 10 from the upper end of outer conductor 1 and second, it acts as a dielectric of a capacitor which provides a low impedance path between the outer conductor 1 and the diode connector 11 through guide 10. The outer conical surface of guide 10 is forced downwardly by a complementary conical nylon washer 13 which, in turn, is forced downwardly by the connector nut 14 which is threaded at its inner lower end to form a threaded joint 20 with outer conductor 1. An annular insulator 12 of substantially rectangular cross section surrounds the lower outer edge of guide 10 to both assist in centering as well as further insulating guide 10 from nut 14. Adequate clearance 35 is provided between the upper end of nut 14 adjacent the upper cylindrical portion of guide 10 so that no conductive path can exist between these two parts.

A bias terminal 16 is provided at the upper end of diode connector 11 and it is secured to the connector by a pair of nuts 17 threaded to the upper end of the connector. It will now be evident that a conductive path may exist from bias terminal 16 through the diode connector 11 to the upper surface of the diode in contact with surface 19 and that while no conductive path exists between connector 11 and the outer conductor 1 there is a very low impedance capacitive path between them by virtue of the dielectric medium comprising mica washer 22.

The short-circuited stub is made adjustable in length by reason of a micrometer mechanism operating on a micrometer screw thread 30, this portion of the mechanism generally being of conventional construction. The adjustment is made by rotating the micrometer thimble 23 to cause this thimble to move longitudinally along the outer conductor 29. The tapered upper portion 27 of this thimble contains the conventional micrometer indicia 33, as illustrated. The lower end of this thimble is connected to a hollow micrometer spindle 28 which surrounds the inner conductor 6 of the shorted stub. The lower end or head 24 of this spindle is secured to thimble 23 by way of washers 25 and a mounting nut 26. The upper end of the hollow spindle 28 is terminated in a series of shorting springs 31 which completely surround the inner conductor 6 and form a firm electrical contact between its outer surface and the inner surface of the outer conductor 29. It will thus be apparent that, as the micrometer thimble is rotated on its threads 30, the shorting springs 31 are caused to move and accurately measure distance along the length of the shorted stub. The actual space between inner conductor 6 and outer conductor 29 is much less than that illustrated as this space has been exaggerated for clarity. Moreover, the hollow micrometer spindle 28 should be made with a fine sliding fit with the inner conductor 6 and the outer conductor 29 so that the spindle also acts as a centering and aligning structure for both center conductors 5 and 6. This avoids the necessity of introducing additional supports inside the coaxial structure which will interfere with measurements due to the unavoidable reflections which they can cause.

Figure 2:
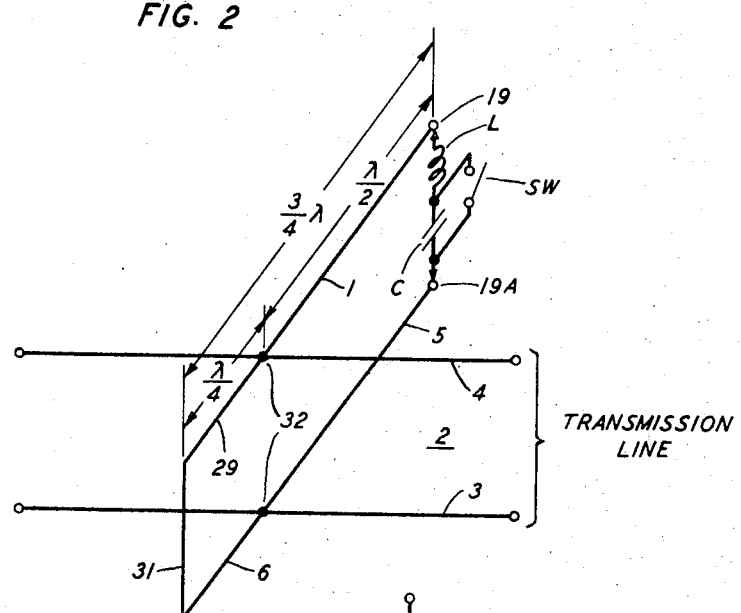
FIG. 2 is a schematic illustrating the electrical circuits established by the structure of FIG. 1 to which has been connected a simplified equivalent network of a diode to be tested.

FIG. 2 is a schematic illustration of the circuits created by the structure of FIG. 1. The transmission line 2 and its conductors 3 and 4 correspond with the inner and outer conductors of the coaxial transmission line in FIG. 1. The short-circuited stub comprising conductors 6 and 29 are shown connected to the transmission line at the junction point 32 corresponding with junction 32 in FIG. 1. This short-circuited stub is shown to be a quarter wavelength long, the length being determined by the position of the shorting springs 31, schematically represented by conductor 31 in FIG. 2. Conductors 1 and 5 correspond with those of the open-circuited stub of FIG. 1 and are also shown connected to the transmission line at the same junction. The open end of this stub terminates in terminals 19 and 19A which correspond with the connecting surfaces 19 and 19A shown in FIG. 1. Between these two terminals is connected the diode to be tested and in this figure it is represented by a simplified equivalent circuit of a diode having an inductance L and a capacitance C. Switch SW represents the switching function of the diode. When the diode is reverse biased, the switch is opened so that the diode appears as an inductor and a capacitor in series but when the switch is closed, which is equivalent to forward biasing the diode, only an inductance appears in the circuit.

The open-circuited stub is shown in FIG. 2 to be one half wavelength long so that the total length for the resonator comprising both stubs is three quarter wavelengths. As previously mentioned, the short-circuited stub could be any odd number of quarter wavelengths long and the open-circuited stub could be any even number of quarter wavelengths long. Under these conditions, both stubs present an infinite impedance at the junction 32. It must be remembered that the length of the open-circuited stub must take into account the effect of any susceptances connected across its open end. Further reference to this figure will be made later in connection with FIG. 4.

The simplified equivalent network of the diode shown between contact surfaces 19 and 19A in FIG. 2 is quite satisfactory for purposes of illustrating the invention and describing its principles and mode of operation. However, for many purposes it is desirable to consider a more complete equivalent network such as is shown in FIG. 3. In this figure, the inductance L and capacitance C are those of the diode and correspond with the same circuit elements in the simplified version of FIG. 2. However, in this case account is taken of a very small conductance G in shunt with the capacitance, the equivalent series reverse resistance $R_r$, the equivalent forward resistance $R_f$, the equivalent series contact resistance $R_c$ at terminals 19 and 19A and the external shunt and fringing capacitance $C_e$ of the diode package. Switch SW is shown switched in series with the capacitance C and the reverse resistance $R_r$ to illustrate the type of circuit existing when the diode is reverse biased. When the diode is forward biased, the equivalent circuit is that shown when the switch is moved to the contact in series with the forward resistance $R_f$. While the operation of the invention will be subsequently described with reference to the simplified network shown in FIG. 2, it is to be understood that the same principles apply to FIG. 3.

FIG. 4 shows a resonator susceptance curve plotted as a function of frequency. The curve below the frequency axis represents the negative susceptance of the short-circuited stub, i.e., the inductive susceptance of the short-circuited stub as it appears at the junction terminals 32 of FIG. 2. Assuming that the resonator contains no diode, the positive or capacitive susceptance of the open-circuited stub will be represented by the curve O above the frequency axis. Resonance will occur at a frequency $f_0$ where the negative susceptance of the shorted stub is just equal to the positive susceptance of the open-circuited stub. Assume now that a diode is connected between the terminals 19 and 19A of FIG. 2 and that this diode is reverse biased. Under these conditions switch SW of the simplified network of FIG. 2 is assumed to be open. The presence of the susceptance provided by inductance L and capacitance C at the end of the open-circuited stub will change the effcetive length of that stub sufficiently to require resonance to occur at a different frequency. With the diode so reverse biased, the resonance characteristic of the combined open-circuited stub and the reverse-biased diode is represented by the curve R. Assuming that the capacitive reactance exceeds the inductive reactance, resonance will now occur at a lower frequency $f_{01}$ but against a frequency where the negative and positive susceptances are equal. It will be noted that the effect of the reverse-biased diode is to cause the open-circuited stub to appear electrically longer than without the diode and the total effective length of both stubs is again three-quarters of a wavelength.

The reverse condition exists when switch SW is closed corresponding to the condition where the diode is forward biased. In this case the effect of the inductance L is to add some negative susceptance to the open-circuited stub and thereby effectively shorten its length. The susceptance characteristic curve F illustrates the susceptance of the open-circuited stub under these conditions and resonance occurs at a higher frequency $f_{02}$ which again occurs when the positive and negative susceptances are equal.

A measurement of the frequencies together with accurate measurements of the lengths of the shorted stub provide the data from which calculations may be made of the diode parameters. The manner by which this is made will be described in more detail with reference to FIGS. 5 and 6.

The curves shown in FIG. 5 are of two kinds. The three dotted line curves A, B and C are three of a family of curves which are obtained in a manner to be subsequently described with reference to FIG. 6. The solid curve represents a typical frequency characteristic of the resonator of this invention where the length of the shorted stub is an odd number of quarter wavelengths and the equivalent length of the open-circuited stub is an even number of such wavelengths. Under these conditions the two stubs will present infinite impedances to the transmission line at their junction 32. It is this latter curve which is of significant value in adjusting the resonator of this invention when making measurements.

The circuit of FIG. 6 is of a type which applicant prefers to use in the practice of his invention. The tapped resonator structure of FIG. 1 comprises block 45. Block 41 is a sweep frequency generator which repetitively sweeps through the entire frequency band of interest. A variable attenuator 42, a frequency meter 43, a ferrite isolator 44 and a directional coupler 47 are connected in series with the output circuit of the sweep generator 41 and the transmission line of the tapped resonator in block 45. The transmission line is terminated in a precision load 46 of characteristic impedance so that standing waves in the transmission line at the resonant frequency of the resonator in block 45 are minimized. At frequencies other than the resonant frequency of the resonator, the stubs will present a discontinuity at junction 32 of FIG. 1 which will cause energy to be reflected back to the directional coupler 47 which directs this return energy toward a crystal detector 48. Detector 48 detects the voltage envelope of this energy and applies it to the vertical deflection terminal Y of an oscilloscope 49. This voltage is poled to produce a downward beam deflection. Synchronized with each frequency sweep from generator 41 is a sweep wave applied to the horizontal deflection terminal X of oscilloscope 49 so that the oscilloscope screen will show a waveform corresponding to a resonance curve, the peak of which corresponds to the resonance point of the resonator in block 45. At the instant of resonance, minimum reflected energy returns through the directional coupler 47 and crystal detector 48 so that only a very small downward deflection takes place. As reflected energy increases for all points of resonance, the beam is caused to deflect downwardly thereby causing the peak of this waveform to represent the resonant condition. The exact frequency of the point of resonance is obtained in a conventional manner by adjusting the frequency meter 43 so that when the frequency sweeps through the frequency for which the meter is adjusted a pip will appear in the oscilloscope waveform thereby accurately marking the frequency. By adjusting the frequency meter until the pip appears at the peak of the oscillogram, the resonant frequency is determined.

Returning again to the curves in FIG. 5, it will be more readily understood how they may be obtained. It is assumed, for example, that the resonator is to operate at three quarter wavelengths as suggested in FIG. 2, i.e., where $$S = 3\lambda/4 = 3v/4f \quad (1)$$

In the foregoing expression S is the equivalent total length of the resonator stubs, $\lambda$ is the wavelength of the resonant frequency, $v$ is the velocity of propagation and $f$ is the resonant frequency. It must be remembered that when a susceptance of any kind is connected across the end of the open-circuited stub the effective length of the resonator is altered so that its resonant frequency is changed. The solid curve of FIG. 5 may be experimentally obtained with the circuit of FIG. 6 by first obtaining the family of dotted curves for several different susceptances connected across the end of the open-circuited stub. The actual values of these susceptances need not be known. For each susceptance a curve, such as the dotted curve A, is obtained by observing the resonant frequency for a range of micrometer settings. If the change in effective resonator length could be determined by a given change in micrometer setting, one should be able to predict the change in frequency for any point on the dotted curves. If one should select point $a$ on curve A and calculates the change in frequency $\Delta f_1$ for a small change in micrometer setting, $\Delta S$, using expression (1) it will be found that the new coordinates define a point which lies on curve A as illustrated in FIG. 5. However, if a different point $a1$ on curve A is selected and the same change in micrometer setting is made, it will be found that the calculated change in frequency $\Delta f_2$ leads to a point outside curve A. Applicant has discovered that this is due to the admittance of junction 32 which also can have the effect of altering the effective resonator length. It did not affect the resonator length at point $a$ because at this point the actual length of the shorted stub was substantially one-quarter the resonating wavelength so that both stubs presented an infinite impedance to the junction, thus rendering the junction admittance ineffective in altering the effective resonator length. Applicant has further discovered that there is one such region on each of the dotted curves as represented by points $b$ and $c$ on curves B and C, respectively. These points on the family of dotted curves may be joined to form the solid curve. A similar curve may be developed for the general case where the shorted stub is any odd number of quarter wavelengths long while the equivalent length of the open-circuited stub is any even number of quarter wavelengths long.

Before making measurements, some preliminary adjustments must be made and some parameters determined. The recess 18 should be temporarily filled with a conductive slug so that the top of inner conductor 5 appears as a plane circular surface. Then the micrometer should be adjusted until its setting and the resonant frequency are coordinates of a point on the solid curve of FIG. 5. This resonant frequency is denoted $f_0$ and the corresponding micrometer setting is $S_0$. A frequency, which may be termed the "reference" frequency, $f_r$, should then be computed from expression (2).

$$f_r = 3f_0(3 - 4f_0C_f/Y_{os})^{-1} \quad (2)$$

In the above expression the capacitance $C_f$ is the capacitance of the fringe field at the open end of the open-circuited stub without a diode. This is experimentally obtained by conventional laboratory procedures. The frequency $f_0$ is the frequency determined as described above and the admittance $Y_{os}$ is the characteristic admittance of the stub resonator which may be calculated with considerable precision. Having determined the above parameters, measurements of the inductance and capacitance L and C, respectively, of the simplified network shown in FIG. 2 may be made.

The first step in measurement is to place the diode to be measured at the end of the open-circuited stub and forward bias it by a current from a source, not shown, flowing through it from bias terminal 16, diode connector 11, the diode and back to the bias source by way of a connection made to any part of the outer conductors 1 or 4. The micrometer is then adjusted until its setting and the resonant frequency are coordinates of the solid curve of FIG. 5. This frequency is $f_{02}$ and the change in micrometer setting from the value $S_0$ is $\Delta S_{12}$. The diode inductance may then be calculated from expression (3).

$$L = -[\omega_{02}Y_{os} \tan(3\pi/2(1 - f_{02}/f_r) + 2\pi\Delta S_{12}/\lambda_{02})]^{-1} \quad (3)$$

where $\omega_{02} = 2\pi f_{02}$, $\lambda_{02}$ is the wavelength at the resonant frequency of the resonator with the diode forward biased and the remaining parameters are as previously defined.

To determine the capacitance, the diode should be reverse biased which is equivalent to opening the switch SW in FIG. 2. The micrometer is now adjusted so that its reading and the frequency again agree with the solid curve of FIG. 5. The frequency thus obtained is $f_{01}$ and the change in micrometer setting from $S_0$ is $\Delta S_{-11}$. The diode capacitance may then be calculated from expression (4).

$$12C = \frac{Y_{os} \tan[3\pi/2(1-f_{o2}/f_r) - 2\pi\Delta S_{11}/\lambda_{o1}]}{\omega_{01}(1 + Y_{os}\omega_{01}L \tan[3\pi/2(1-f_{o1}/f_r) - 2\pi\Delta S_{11}/\lambda_{o1}])} \quad (4)$$

where $\omega_{01} = 2\pi f_{01}$, $\lambda_{01}$ is the wavelength at the resonant frequency of the resonator with the diode reverse biased, L is the inductance determined by expression (3) and the remaining parameters are as previously defined.

While this invention has been specifically described with reference to a particular embodiment involving coaxial type structures, other types of transmission lines may obviously be substituted and the mechanical design features may be rearranged in accordance with the principles of the invention. These modifications are well within the skill of those working in this field and should be considered within the scope of this invention.

What is claimed is:

1. A device for measuring the impedance parameters of a diode operating at microwave frequencies comprising a section of transmission line, a resonator having a short-circuited stub and an open-circuited stub, said stubs and said section of transmission line being joined together at a common junction point located intermediate the ends of said section of transmission line, the total length of said two stubs being substantially equal to an odd number of quarter wavelengths at the test frequency but not less than three such lengths, means for connecting a diode to be measured across the open end of said open-circuited stub and means for adjusting the length of said short-circuited stub to provide an adjusted length indication used for calculating the impedance parameters of said diode.

2. The combination of claim 1 and means for applying a direct current bias to said diode.

3. The combination of claim 1 wherein said short-circuited stub is adjustable to one-quarter wavelength.

4. The combination of claim 1 wherein the open-circuited stub is an even number of quarter wavelengths long and the short-circuited stub is adjustable to an odd number of quarter wavelengths.

5. The combination of claim 1 wherein said means for adjsting the length of said short-circuited stub comprises a slidable contact means for establishing a short circuit path across said stub, a micrometer crew mechanism connected to said contact means to drive said means along the length of said stub, and a scale comprising part of said micrometer screw mechanism from which the length of said stub may be directly read.

6. The combination of claim 1 wherein said means for connecting the diode comprises a removable connector electrode and a spring positioned to urge said electrode toward the end of the open-circuited stub so that the diode may be resiliently clamped between said electrode and the end of said stub.

7. Means for measuring the impedance parameters of a diode operating at microwave frequencies comprising a section of coaxial transmission line having an inner conductor and an outer conductor, a variable length short-circuited coaxial stub having an inner conductor and an outer conductor connected to the inner and outer conductors, respectively, of said line at a junction point along the length of said line, an open-circuited coaxial stub also having inner and outer conductors, the inner and outer conductors of said short-circuiter stub being connected, respectively, to those of said open-circuited stub and said section of transmission line at a common junction point along the length of said line intermediate its ends, said two stubs constituting a resonator having a total length substantially equal to an odd number of one-quarter wavelengths at the test frequency but not less than three such lengths, means for connecting a diode to be measured across the open end of said open-circuited stub and means for adjusting the length of said short-circuited stub to provide an adjusted length indication used for calculating the impedance parameters of said diode.

8. The combination of claim 7 and means for applying a direct current bias to said diode.

9. The combination of claim 7 wherein said variable length short-circuited stub is adjusted to one-quarter wavelength.

10. The combination of claim 7 wherein the open-circuited stub is an even number of one-quarter wavelengths long and the short-circuited stub is adjustable to an odd number of one-quarter wavelengths.

11. The combination of claim 7 wherein said means for adjusting the length of said short-circuited stub comprises a slidable contact means for establishing a short circuit path across said stub, a micrometer screw mechanism connected to said contact means to drive said means along the length of said stub, and a scale comprising part of said micrometer screw mechanism from which the length of said stub may be directly read 12 The combination of claim 7 wherein said means for connecting the diode comprises a removable connector electrode and a spring positioned to urge said electrode toward the end of the inner conductor of the open-circuited stub so that the diode may be resiliently clamped between said electrode and the end of said inner conductor, said electrode being conductively insulated from said inner and outer conductors but connected to said outer conductor through a low capacity reactance

References Cited

UNITED STATES PATENTS 3,191,125  6/1965  Hunton et al.
3,210,676  10/1965  Kraus _____ 333—83 XR
3,328,670  6/1967  Parker _____ 333—73 XR RUDOLPH V. ROLINEC, Primary Examiner.

E. L. STOLARUN, Assistant Examiner.

U.S. Cl. X.R.

324—58; 333—73, 97